(12) United States Patent
Shinohara et al.

(10) Patent No.: US 6,791,613 B2
(45) Date of Patent: Sep. 14, 2004

(54) SIGNAL PROCESSING APPARATUS

(75) Inventors: Mahito Shinohara, Machida (JP); Tomoyuki Noda, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 767 days.

(21) Appl. No.: 09/793,572

(22) Filed: Feb. 27, 2001

(65) Prior Publication Data

US 2001/0028066 A1 Oct. 11, 2001

(30) Foreign Application Priority Data

Feb. 29, 2000 (JP) ........................................ 2000-054136

(51) Int. Cl.$^7$ .......................... H04N 3/14; H04M 5/335
(52) U.S. Cl. ...................................... 348/308; 348/303
(58) Field of Search ................................ 348/308, 306, 348/305, 304, 303, 302, 241; 250/208.1; 257/215, 291, 114, 108, 119

(56) References Cited

U.S. PATENT DOCUMENTS

| | | | |
|---|---|---|---|
| 4,831,454 A | | 5/1989 | Tanaka et al. .......... 358/213.31 |
| 5,406,332 A | * | 4/1995 | Shinohara et al. .......... 348/308 |
| 6,320,616 B1 | * | 11/2001 | Sauer ........................ 348/241 |

* cited by examiner

*Primary Examiner*—Aung Moe
(74) *Attorney, Agent, or Firm*—Fitzpatrick, Cella, Harper & Scinto

(57) ABSTRACT

The invention provides a signal processing apparatus having clamp capacitance device for receiving, at one electrode thereof, first and second signals outputted from a signal source, a signal transfer transistor of which one main electrode is connected to an other electrode of the clamp capacitance device, signal accumulating capacitance device connected to an other main electrode of the signal transfer transistor, and reset device for fixing the potential of the signal accumulating capacitance device, wherein the potential of the signal accumulating capacitance device is fixed by the reset device while the first signal is outputted from the signal source and the signal accumulating capacitance device is maintained in a floating state while the second signal is outputted from the signal source, and the signal transfer transistor is controlled in such a manner that the potential of the main electrode of the signal transfer transistor and that of the other main electrode thereof show different saturation operations while the signal charge is transferred through the clamp capacitance device and the signal transfer transistor during the output of the first and second signals, thereby causing the saturation current to transfer the signal charge.

14 Claims, 7 Drawing Sheets

US 6,791,613 B2

SIGNAL PROCESSING APPARATUS

BACKGROUND OF THE INVENTION

1. Field of the Invention

The present invention relates to a signal processing apparatus having a clamping capacity.

2. Related Background Art

For the solid-state image pickup apparatus, CCD has been conventionally employed because of its high S/N ratio. On the other hand, there has been developed so-called amplifying-type solid-state image pickup apparatus which is featured by the simplicity of use and the low electric power consumption. The amplifying solid-state image pickup apparatus is to guide a signal charge accumulated in a light receiving pixel to a control electrode of a transistor provided in the pixel portion and to output an amplified signal from a main electrode, and is known in various types such as an SIT image sensor utilizing an SIT (static induction transistor) as the amplifying transistor, a bipolar image sensor utilizing a bipolar transistor, a CMD utilizing a JFET (junction field effect transistor) in which the control electrode (gate) is depleted, and a CMOS sensor utilizing a MOS transistor. Intensive development is being conducted for the CMOS transistor, since it matches well with the CMOS process and allows to form peripheral CMOS circuits on a single chip. In such amplifying solid-state image pickup apparatus however, the output offset of the amplifying transistor in each pixel is different from pixel to pixel, so that a fixed pattern noise (FPN) is superposed with the output signal of the image sensor. There have been proposed various signal output circuits in order to eliminate such FPN. In the following there will be explained a representative example of such CMOS sensor.

FIG. 1 is a circuit diagram of a conventional CMOS image sensor and a readout circuit therefor, showing unit pixels 1 illustrated in a 2×2 matrix arrangement for the purpose of simplicity. In FIG. 1 there are shown a photodiode 2 for accumulating a signal charge by receiving light, a MOS transistor 3 for amplifying the signal charge, a transfer MOS transistor 4 for transferring the signal charge accumulated in the photodiode 2 to the gate electrode of the MOS transistor 3, a reset MOS transistor 5 for resetting the gate electrode potential of the MOS transistor 3, and a power supply potential supply line 6 to which commonly connected are the drain electrode of the reset MOS transistor 5 and the drain electrode of the amplifying MOS transistor 3. There are also shown a selector switch MOS transistor 7 for selecting an output pixel, and a pixel output line 8. When the selector switch MOS transistor 7 is turned on, the source electrode of the amplifying MOS transistor and the output line 8 are connected whereby the signal output of a selected pixel is guided to the output line 8. A constant current supply MOS transistor 9 for feeding a constant current to the pixel output line 8, which supplies the amplifying MOS transistor 3 with a load current through the selector switch MOS transistor 7, thereby causing the amplifying MOS transistor 3 to function as a source follower and outputting to the output line 8 a potential corresponding to the gate potential of the MOS transistor 3 with a constant voltage difference. There are also shown a transfer control line 10 for controlling the gate potential of the transfer MOS transistor 4, a reset control line 11 for controlling the gate potential of the reset MOS transistor 5, a selection control line 12 for controlling the gate potential of the selecting MOS transistor 7, a constant potential supply line 13 for supplying the gate of the MOS transistor 9 with a constant potential thereby causing the MOS transistor 9 to operate in a saturation region thereby constituting a constant current supply source, a pulse terminal 14 for supplying the transfer control line 10 with a transfer pulse, a pulse terminal 15 for supplying the reset control line 11 with a reset pulse, a pulse terminal 16 for supplying the selection control line 12 with a selection pulse, a vertical scanning circuit 17 for selecting in succession rows of the pixels in a matrix arrangement, an output line 18 of the vertical scanning circuit 17, including a first row selecting output line 18-1 and a second row selecting output line 18-2, a switching MOS transistor 19 for guiding the pulse from the pulse terminal 14 to the transfer control line 10, a switching MOS transistor 20 for guiding the pulse from the pulse terminal 15 to the reset control line 11, and a switching MOS transistor 21 for guiding the pulse from the pulse terminal 16 to the selection control line 12. The gates of the MOS transistors 19, 20, 21 are connected to the row selecting output line 18, and the row of the pixels to be driven is determined by the state of the row selecting output line 18. An output readout circuit 22 of a pixel is provided with a capacitance 23 for holding a reset signal output of the pixel, a capacitance 24 for holding a photo signal output of the pixel, a switching MOS transistor 25 for turning on/off the conduction between the pixel output line 8 and the capacitance 23, a switching MOS transistor 26 for turning on/off the conduction between the pixel output line 8 and the capacitance 24, a noise output line 27 for guiding the reset output held in the capacitance 23, a signal output line 28 for guiding the signal output held in the capacitance 24, a switching MOS transistor 29 for turning on/off the conduction between the capacitance 23 and the noise output line 27, a switching MOS transistor 30 for turning on/off the conduction between the capacitance 24 and the signal output line 28, a noise output line resetting MOS transistor 31 for resetting the potential of the noise output line 27, a signal output line resetting MOS transistor 32 for resetting the potential of the signal output line 28, a power supply terminal 33 for supplying the source electrodes of the resetting MOS transistors 31, 32 with a reset potential, and a horizontal scanning circuit 34 for selecting in succession the above-mentioned capacitances 23, 24 provided in each column of the pixels in a matrix arrangement, including an output line 35-1 for selecting a first column and an output line 35-2 for selecting a second column. The output line of the horizontal scanning circuit 34 is connected to the gates of the switching MOS transistors 29, 30. There are further shown a pulse supply terminal 36 for applying a pulse to the gates of the resetting MOS transistors 31, 32, pulse supply terminals 37, 38 for respectively applying pulses to the gates of the switching MOS transistors 25, 26, a differential amplifier 39 for amplifying and outputting the differential voltage between the potential of the noise output line 27 and that of the signal output line 28, and an output terminal 40 of the differential amplifier 39.

In the following there will be explained the operation of the sensor shown in FIG. 1, with reference to a timing chart shown in FIG. 2. It is assumed that each of the MOS transistors shown in FIG. 1 is N type, which is turned on or off respectively when the gate potential is at the high or low level state. In timing pulse $\Phi_{14}$ to $\Phi_{38}$ in FIG. 2, the suffixes 14 to 38 respectively coincide with the numbers of the pulse input terminals shown in FIG. 1, and $\Phi_{14}$ to $\Phi_{38}$ indicate the pulses entering the respective input terminals.

At first the vertical scanning circuit 17 shifts the pulse $\Phi_{18-1}$ supplied to the terminal 18-1 to the high level state to enable the operation of the first row of the pixel matrix.

When the pulse $\Phi_{16}$ applied to the terminal 16 is shifted to the high level state, the source of the amplifying MOS transistor 3 of the pixel is connected with the constant current power supply 9 through the output line 8 whereby the output of the source follower of the pixel is outputted to the output line 8. Then the pulse $\Phi_{15}$ applied to the terminal 15 is shifted to the high level state to reset the gate of the amplifying MOS transistor 3 by the resetting MOS transistor 5, and, when the pulse $\Phi_{37}$ applied to the terminal 37 is shifted to the high level state, the reset output of the pixel is accumulated in the capacitance 23 through the MOS transistor 25. Then the pulse $\Phi_{14}$ applied to the terminal 14 is shifted to the high level state whereby the signal charge accumulated in the photodiode 2 is transferred, through the transfer MOS transistor 4, to the gate of the MOS transistor 3. Subsequently, when the pulse $\Phi_{38}$ applied to the terminal 38 is shifted to the high level state, whereby a signal output superposed with the reset output of the pixel, is accumulated through the MOS transistor 26 in the capacitance 24. The reset outputs of the pixels show variety because of the fluctuation of the threshold voltage of the MOS transistors 3 of the pixels. Therefore, the difference of the outputs accumulated in the capacitances 23, 24 becomes a pure signal without the noise. With the operation of the horizontal scanning circuit 34, the pulses $\Phi_{35\text{-}1}$, $\Phi_{35\text{-}2}$ applied to the output lines 35-1, 35-2 are shifted to the high level state in succession, whereby the outputs accumulated in the capacitances 23, 24 of each column are guided, respectively through the MOS transistors 29, 30, to the horizontal output lines 27, 28. Prior to the shifting to the high level state of the control pulses $\Phi_{35\text{-}1}$, $\Phi_{35\text{-}2}$ applied to the output lines 35-1, 352, the pulse $\Phi_{36}$ applied to the terminal 36 is shifted to the high level state to reset the horizontal output lines 27, 28 through the MOS transistors 31, 32. The pixel reset output and the signal output superposed with the pixel reset output, guided to the horizontal output lines 27, 28 are input to the differential amplifier 39, thereby outputting a pixel signal without noise, namely after the deduction of the reset level, from the output terminal 40.

In the following there will be explained, with reference to FIG. 3, a conventional signal readout circuit of another system.

In FIG. 3, there is shown a readout circuit 56 corresponding to the readout circuit 22 shown in FIG. 1, and components equivalent to those in FIG. 1 are represented by corresponding numbers. The configurations other than the readout circuit 56 and the output amplifier are the same as those in FIG. 1 and are therefore omitted in FIG. 3.

In FIG. 3, there are shown a pixel output line 8 equivalent to the output line 8 in FIG. 1, a clamp capacitance 41 for clamping the pixel output, a clamping MOS switch 42, a power supply terminal 43 for supplying a clamping potential, a terminal 44 for applying a pulse to the gate of the MOS transistor 42, a capacitance 45 for accumulating a signal output, a switching MOS transistor 46 for connecting the clamping capacitance 41 and the accumulating capacitance 45, a terminal 47 for applying a pulse to the gate of the MOS transistor 46, a MOS transistor 48 receiving the output 50 of a horizontal shift register 34 for transferring the signal accumulated in the accumulating capacitance 45, a horizonal output line 49 for transferring the signal accumulated in the accumulating capacitance 45, an amplifier 51 for amplifying and outputting the signal appearing on the horizontal output line 49, and an output terminal 52 of the amplifier 51.

The readout circuit shown in FIG. 3 operates in the following manner. The signals from the pixel are outputted, as in the first conventional example explained with reference to FIGS. 1 and 2, in the order of a reset output and a signal output which is superposed with signal charge transferred on the reset level. The MOS transistors shown in FIG. 3 are assumed to be turned on or off respectively the gate potential thereof is at the high or lower level state. Thus, when the reset output of a pixel appears on the output line 8, high level potentials are applied to the terminals 44, 47 to turn on the MOS transistors 42, 46 thereby maintaining potential of each of the clamp portion 41 and the accumulating capacitance 45 at the clamping potential supplied to the terminal 43. Then, after the terminal 44 is shifted to the low level state to turn off the MOS transistor 42, the signal output is given to the signal line 8, whereby the signal voltage appears in the accumulating capacitance 45 through the clamping capacitance 41. The terminal 47 is shifted to the low level in this state to turn off the MOS transistor 46. The signals accumulated in the capacitances 45 are outputted in succession through the amplifier 51 to the output terminal 52, according to the output of the horizontal shift register.

However, the first conventional example explained in the foregoing with reference to FIGS. 1 and 2 has been accompanied by the following drawbacks because the output potential from the pixel is directly accumulated in the accumulating capacitance and the pixel output is input to the differential amplifier under a capacitative division by the capacitance of the horizontal output line and the aforementioned accumulating capacitance.

A first drawback lies in the loss in the signal output potential. In FIG. 1, it is assumed that the pixel resetting accumulating capacitance 23 has a capacitance $C_{TN}$, the pixel signal accumulating capacitance 24 has a capacitance $C_{TS}$, the horizontal output line 27 has a capacitance $C_{HN}$, the horizontal output line 28 has a capacitance $C_{HS}$, the reset output potential for the pixel is $V_N$, and the signal voltage superposed on the reset level of the pixel is $V_S$. The input ports of the differential amplifier receive potentials $|C_{TN}/(C_{HN}+C_{TN})| \cdot V_N$ and $|C_{TS}/(C_{HS}+C_{TS})| \cdot (V_N+V_S)$ resulting from the capacitative division. Since the circuit is so designed that $C_{HN}=C_{HS}$ and $C_{TN}=C_{TS}$, a signal $|C_{TS}/(C_{HS}+C_{TS})| \cdot gV_S$ without the noise component $V_S$ is output to the output terminal 40, wherein g represents the gain of the differential amplifier 39. Thus the signal output is lower than the pixel output by a factor $C_{TS}/(C_{HS}+C_{TS})$, except for the gain g of the differential amplifier. $C_{HS}$ and $C_{HN}$ become larger as the number of pixel columns increases, so that the loss of the signal output becomes more conspicuous.

A second drawback lies in a loss in the noise eliminating ability resulting from the unevenness in the capacitances $C_{HS}$ and $C_{HN}$ and in those $C_{TS}$ and $C_{TN}$, eventually resulting in an increased noise level. As explained in the foregoing, the input ports of the differential amplifier receive the potentials respectively corresponding to $C_{TS}/(C_{HS}+C_{TS})$ and $C_{TN}/(C_{HN}+C_{TN})$ times of the pixel output voltage, and, even through $C_{TS}$ and $C_{TN}$ are designed with an identical pattern, they inevitably show certain fluctuation in size in the practical fubrication. Also $C_{TS}$ and $C_{TN}$ tend to show a difference in the parasite capacitance, resulting for example from a fact that one of the output lines 27, 28 is closer to the horizontal shift register 34 while the other is farther therefrom, as will be apparent from the arrangement of such output lines shown in FIG. 1. Thus, if $C_{TS}/(C_{HS}+C_{TS})$ and $C_{TN}/(C_{HN}+C_{TN})$ are mutually different because of these factors, residual of the pixel reset level cancellation will be contained in the output of the differential amplifier. Since the pixel reset level is different from pixel to pixel because of the fluctuation in the threshold voltage of the MOS transistor of each pixel, such residual represents a fixed pattern noise (FPN).

A third drawback lies in the slow signal transfer to the horizontal output line. The reset output potential of a pixel is determined by the gate reset level of the MOS transistor 3 of the source follower amplifier of the pixel and the gate-source potential difference $V_{gs}$ in the source follower operation. As the gate reset level is given by (VDD–$V_{th}$) in which VDD is the potential of the power supply line 6 in FIG. 1 and $V_{th}$ is the threshold voltage of the resetting MOS transistor 5 of the pixel, the pixel reset output is given by (VDD–$V_{th}$–$V_{gs}$) which is usually at about the middle of VDD and ground level and which will be represented by $V_{RS}$. Since the reference output level of the solid-state image pickup device is taken at a dark state when $V_S$=0, namely at $V_{RS}$, the potential of the resetting power supply terminal 33 for the horizontal output line is also selected at $V_{RS}$. Consequently, when the high level potential VDD is applied to the gate of the transfer MOS transistor at the signal transfer from the capacitances 23, 24 to the horizontal output lines, the gate-source potential becomes (VDD–$V_{RS}$), thus showing a higher on-resistance of the channel in comparison with a state where the gate-source potential is VDD and resulting in a slower signal transfer to the horizontal output line.

The above-described first drawback is more conspicuous in the second conventional example explained with reference to FIG. 3. More specifically, this is because the signal voltage accumulated in the capacitance 45 is subjected to a capacitative division $C_O/(C_O+C_T)$ on the pixel output signal voltage, wherein $C_O$ and $C_T$ are magnitudes of the capacitances 41, 45, and such signal voltage is further subjected to a capacitative division $C_T/(C_H+C_T)$ at the entry into the amplifier 51 wherein $C_H$ is the capacitance of the horizontal output line 49.

The second drawback, namely the generation of the fixed pattern noise resulting from the fluctuation of $C_T$ in each column, remains same also in the second conventional example.

The third drawback can however be avoided in the second conventional example by suitable selection of the clamping potential.

SUMMARY OF THE INVENTION

The object of the present invention is to provide a signal processing apparatus capable of efficient signal transfer.

The above-mentioned object can be attained, according to one aspect of the present invention, by a signal processing apparatus comprising clamp capacitance means for receiving, at one electrode thereof, first and second signals outputted from a signal source; a signal transfer transistor of which one main electrode is connected to an other electrode of the clamp capacitance means; signal accumulating capacitance means connected to an other main electrode of the signal transfer transistor; and reset means for fixing the potential of the signal accumulating capacitance means; and control means for fixing the potential of the signal accumulating capacitance means by the reset means when the first signal is outputted from the signal source and maintaining the signal accumulating capacitance means in a floating state when the second signal is outputted from the signal source; and while the signal charges are transferred from the clamp capacitance means through signal transfer transistor during the output of the first and second signals, controlling the signal transfer transistor in such a manner that the potential of the one main electrode thereof is different from that of the other main electrode thereby causing the signal charge to be transferred by a saturation current.

According to another aspect of the present invention, there is also provided a signal processing apparatus comprising clamp capacitance means for receiving, at one electrode thereof, a signal from a signal source; signal accumulating capacitance means of which one main electrode is connected to an other electrode of the clamp capacitance means, signal accumulating capacitance means connected to an other main electrode of the signal transfer transistor; reset means for fixing the potential of the signal accumulating capacitance means; and control means for controlling the potential of the control electrode of the signal transfer transistor in such a manner that, among the charges on the aforementioned main electrode of the signal transfer transistor at the side of the clamp capacitance means of which potential varies according to the change in the potential of the output signal from the signal source, a charge in a potential level exceeding the channel potential of the signal transfer transistor is transferred to the signal accumulating capacitance means by a saturation current or a sub-threshold current of the signal transfer transistor.

The above and other objects, features and technological advantages of the present invention will become apparent from the following detailed description of preferred embodiments of the present invention, taken in conjunction with the accompanying drawings.

DESCRIPTION OF THE PREFERRED EMBODIMENTS

Now the present invention will be clarified in detail by embodiments thereof, with reference to the accompanying drawings.

Figure 1:
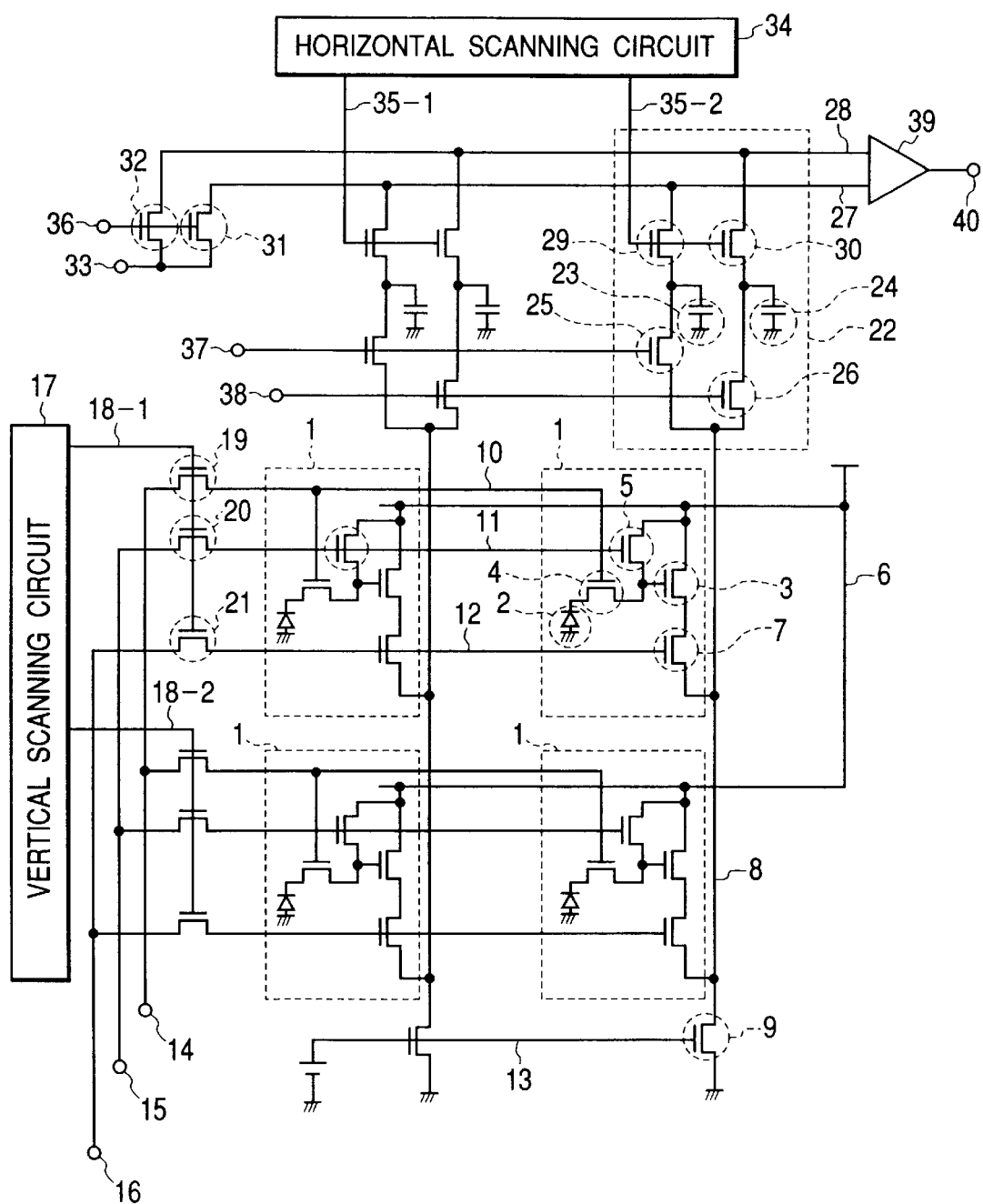
FIG. 1 is a circuit diagram of a first conventional example.
Figure 3:
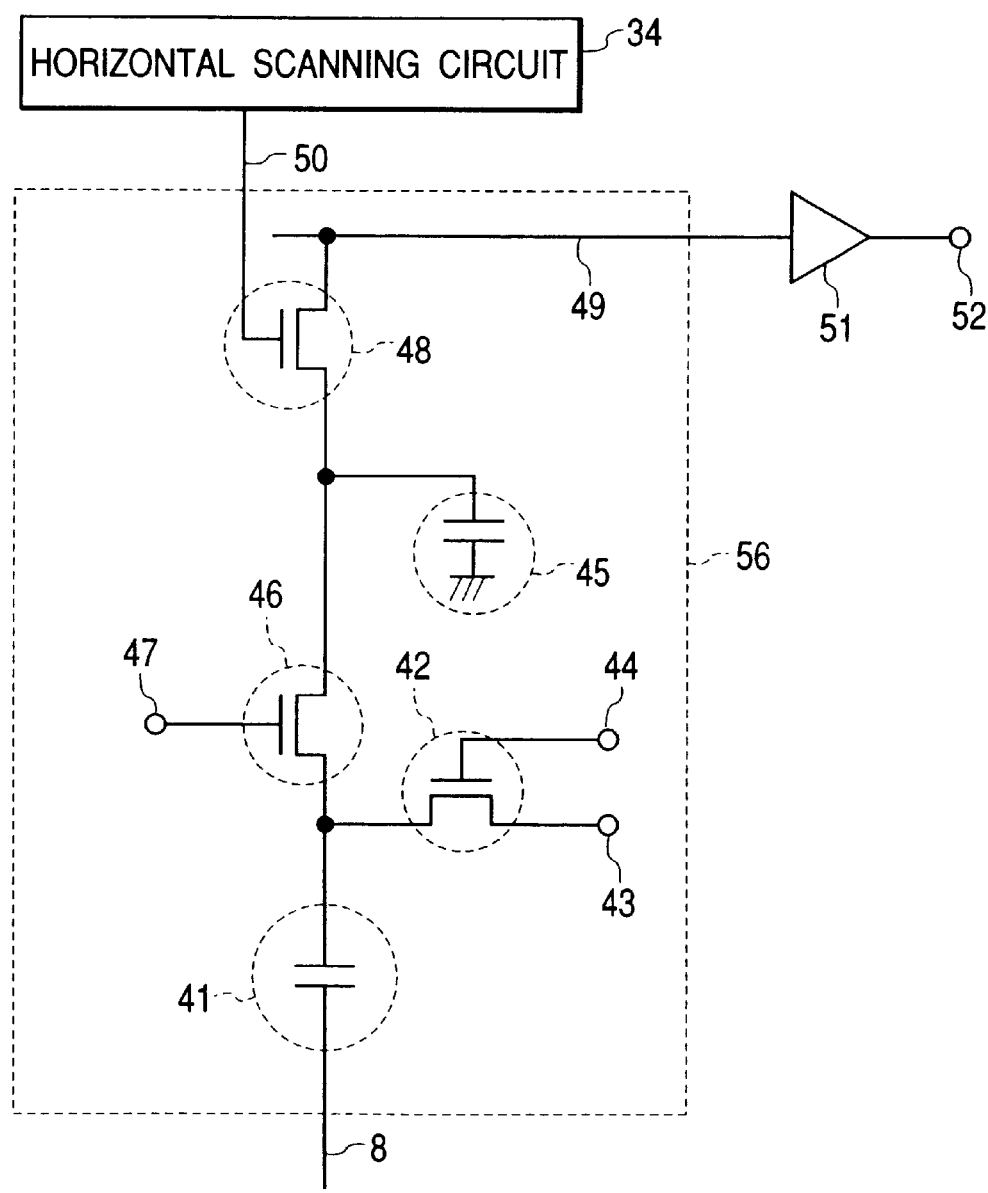
FIG. 3 is a circuit diagram of a second conventional example.
Figure 4:
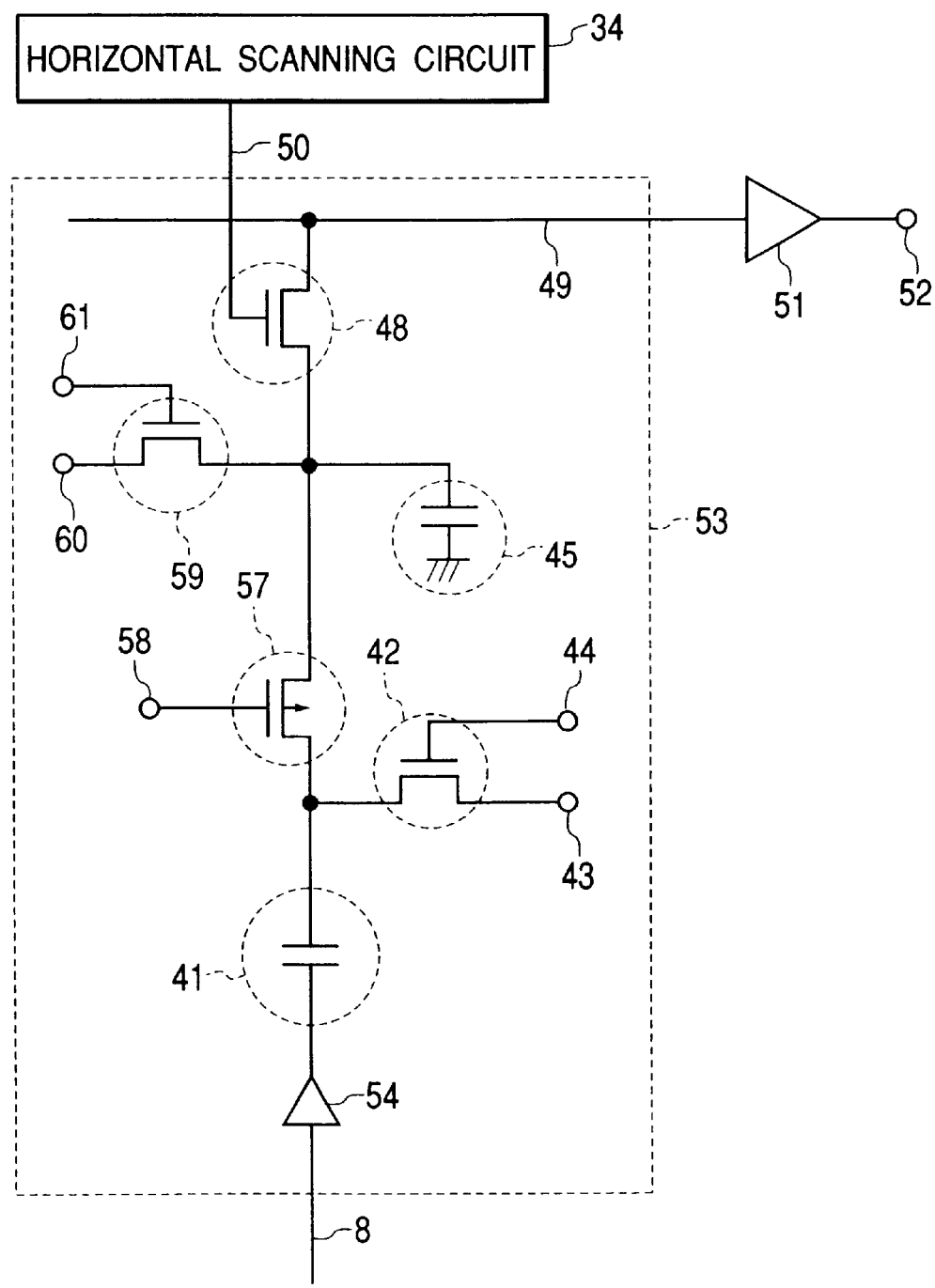
FIG. 4 is a circuit diagram of a first embodiment of the present invention.

FIG. 4 is a partial circuit diagram of a signal readout circuit in a first embodiment of the solid-state image pickup element of the present invention, wherein a readout circuit 53 of the present embodiment corresponds to the readout circuit 22 in FIG. 1 or that 56 in FIG. 3. The configuration of the photoelectric converting pixel is same as that of the unit pixel 1 shown in FIG. 1.

Referring to FIG. 4, there are shown an amplifier 54 for amplifying the pixel output, having an output of a positive phase where the amplifier 54 shows a higher output potential for a larger signal, a PMOS transistor 57 constituting a signal transfer transistor for transferring the signal charge to a capacitance 45, a gate electrode input terminal 58 for the PMOS transistor 57, a MOS transistor 59 constituting reset means for resetting the accumulating capacitance 45, a reset potential supply terminal 60 for the capacitance 45, and a gate input terminal 61 for the reset MOS transistor 59. In FIG. 4, components the same as those in FIGS. 1 and 3 are represented by same numbers and will not be explained further. The amplifier 54 in FIG. 4 constitutes a buffer for obtaining a driving power required for driving the clamp capacitance 41 constituting the clamp capacitance means in case the output resistance of the pixel is large, and the present invention may dispense with such the buffer if the output resistance of the pixel is small enough. The transfer MOS transistor 57 is composed of a PMOS transistor for the signal output of a positive phase but an NMOS transistor for the signal output of an inverse phase. This MOS transistor operates as a charge transfer gate, of which part is different from the switch MOS transistor in the conventional configuration shown in FIG. 3.

Figure 5:
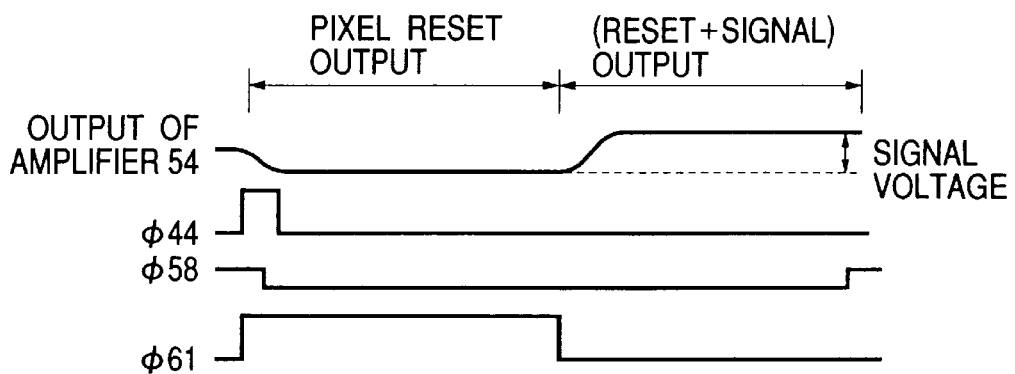
FIG. 5 is a timing chart showing the function of the first embodiment of the present invention.
Figure 6:
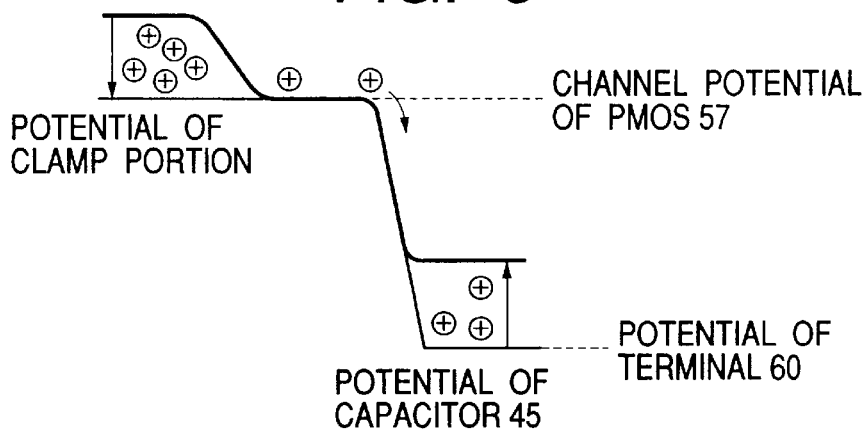
FIG. 6 is a chart showing the potentials of the first embodiment of the present invention.

FIG. 5 is a timing chart showing the operation of the present embodiment 1. In FIG. 5, signals $\Phi_{41}$, $\Phi_{58}$ and $\Phi_{61}$ have suffixes 44, 58, 61 respectively coinciding with the number of the pulse input terminals shown in FIG. 4 and respectively indicate potentials (or pulses) at such input terminals. The MOS transistors 42, 59 are assumed to be turned on or off respectively when the gate potential is high or low. When the pixel reset output starts to emerge from the amplifier 54, an electrode of the clamp capacitance 41 is fixed to the potential of the terminal 43 through the MOS transistor 42. The gate potential of the gate electrode input terminal 58 is selected somewhat lower than a potential, defined by subtracting the threshold voltage of the PMOS transistor 57 from the potential of the terminal 43. The potential of the capacitance 45 is fixed at the potential of the terminal 60, but is selected at such a sufficiently low level that the transfer MOS transistor 57 executes a saturation operation or a sub-threshold value operation. When the MOS transistor 42 is turned off, a saturation current or a sub-threshold current flows in the transfer MOS transistor 57, whereby the potential of an electrode of the clamp capacitance 41, namely the source potential of the PMOS transistor 57 approaches a potential $V_{CL}$ determined by the potential of the terminal 58 and the threshold voltage of the PMOS transistor 57. When the pixel reset output is terminated, the MOS transistor 59 is turned off whereby the accumulating capacitance 45 is maintained in a floating state, and, when the pixel signal output is started, the potential of the clamping portion (namely potential of an electrode of the clamp capacitance 41 at the side of the transfer MOS transistor) tends to be pushed up corresponding to the signal voltage through the clamp capacitance. However, as shown in the potential chart in FIG. 6, the potential of the clamping portion returns to $V_{CL}$ within the (reset+signal) output period, by the current flowing through the MOS transistor 57. Consequently the signal charge corresponding to the product $C_O \cdot V_S$ of the clamp capacitance $C_O$ and the signal voltage $V_S$ alone, not including the reset level, is accumulated in the capacitance 45 in the floating state. By shifting the terminal 58 to the high level state to completely turn off the transfer MOS transistor 57 at a certain time during the (reset+signal) output state, the signal charge $C_O \cdot V_S$ is retained in the accumulated state in the capacitance 45.

Figure 2:
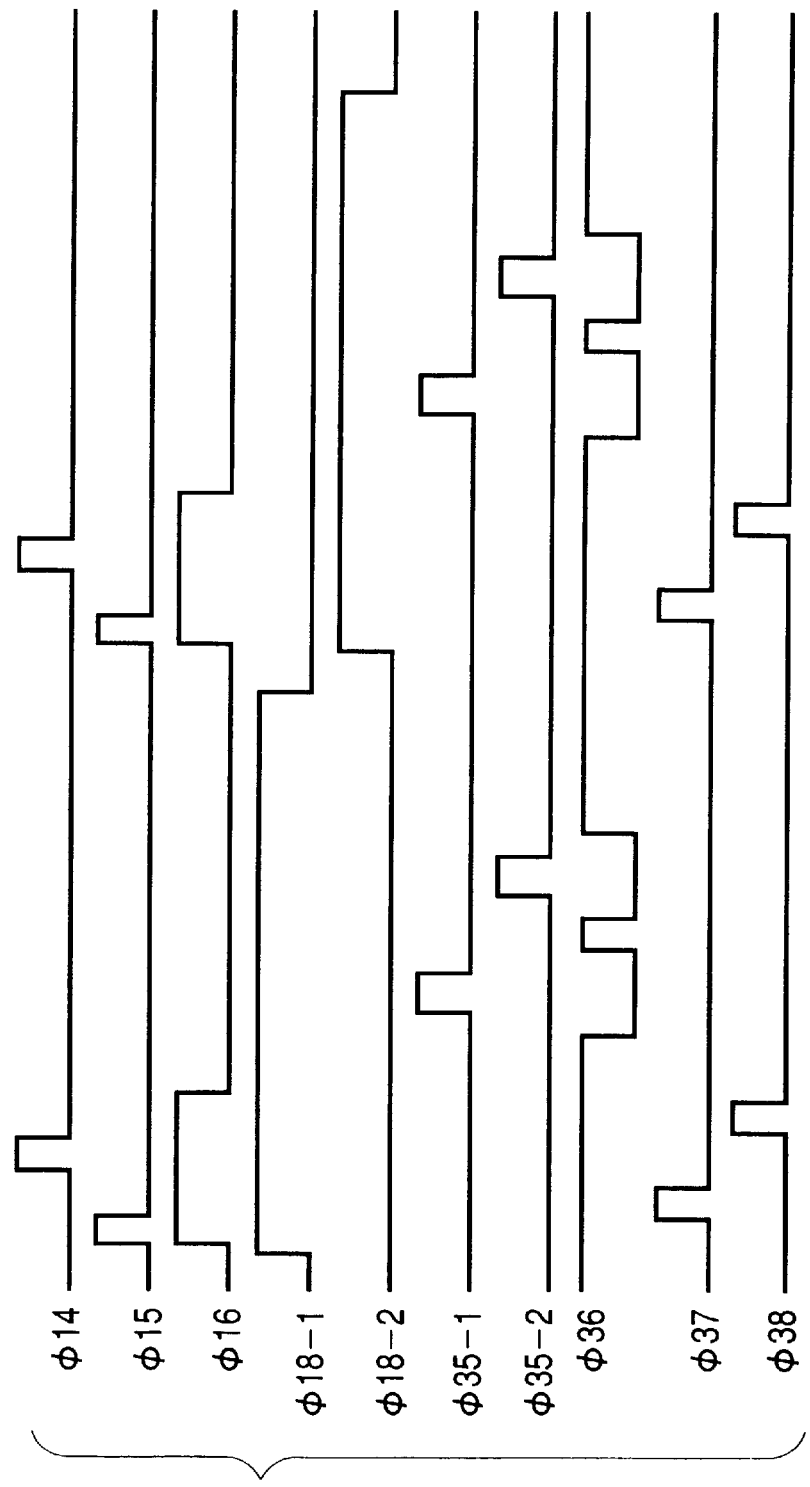
FIG. 2 is a timing chart showing the function of the first conventional example.

In the present embodiment, the signal voltage read out to the output line 49 is $|C_T/(C_H+C_T)| \cdot (C_O \cdot V_S/C_T)$ or $|C_O/(C_H+C_T)| \cdot V_S$, and the loss of the signal voltage resulting from capacitative division can be maintained smaller than in the conventional examples by selecting $C_O$ to be larger and $C_T$ to be smaller. Also there cannot be generated the fixed pattern noise resulting from the unbalance of the two output paths $C_{HN}$, $C_{HS}$ as in the first conventional example shown in FIGS. 1 and 2. Although the fixed pattern noise is surely generated by the fluctuation of $C_T$, its contribution is much smaller than in the conventional examples, so that the fixed pattern noise can be made smaller than in the conventional examples if the fluctuation in $C_O$ can be suppressed. Also by setting the reset potential for the capacitance 45 supplied from the terminal 60 sufficiently low, the on-resistance of the MOS transistor 48 can be made smaller so that the horizontal signal transfer can be achieved at a high speed.

Figure 7:
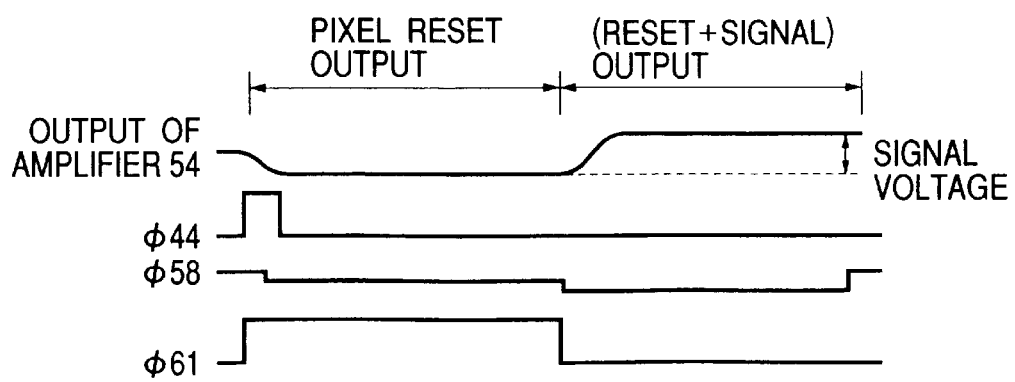
FIG. 7 is a timing chart showing the function of a second embodiment of the present invention.

The circuit configuration in a second embodiment of the present invention is the same as the first embodiment shown in FIG. 4. The timing of operation, shown in FIG. 7, is different from the first embodiment in that the gate potential of the transfer MOS transistor 57 is made different between the pixel reset output and the (reset+signal) output and is made lower in the latter.

In the first embodiment, the potential of the clamping portion in the (reset+signal) output becomes $V_{CL}$ if the signal voltage is sufficiently large but becomes lower than $V_{CL}$ if the signal voltage is 0 or very small. This is because even if the signal voltage is 0, the subthreshold current flowing in the MOS transistor 57 at the pixel reset output period, of which magnitude decreases, continues to flow in the (reset+signal) output period. Consequently, in the (reset+signal) output, the final potential of the clamping portion depends on the magnitude of the signal voltage, so that the linearity of the signal in the capacitance 45 is not retained. On the other hand, if the charge flowing in the transfer MOS transistor 57 is more than a certain amount, the potential of the clamping portion eventually reaches a certain value regardless of the initial value thereof. In order to secure a certain amount of such flowing charge, the potential of the terminal 58 is made lower in the (reset+signal) output period than in the reset output period as shown in FIG. 7, whereby the potential of the clamping portion at the end of the (reset+signal) output period assumes a constant value not depending on the magnitude of the signal voltage. In this manner there can be secured the linearity of the transferred signal in the capacitance 45.

Figure 8:
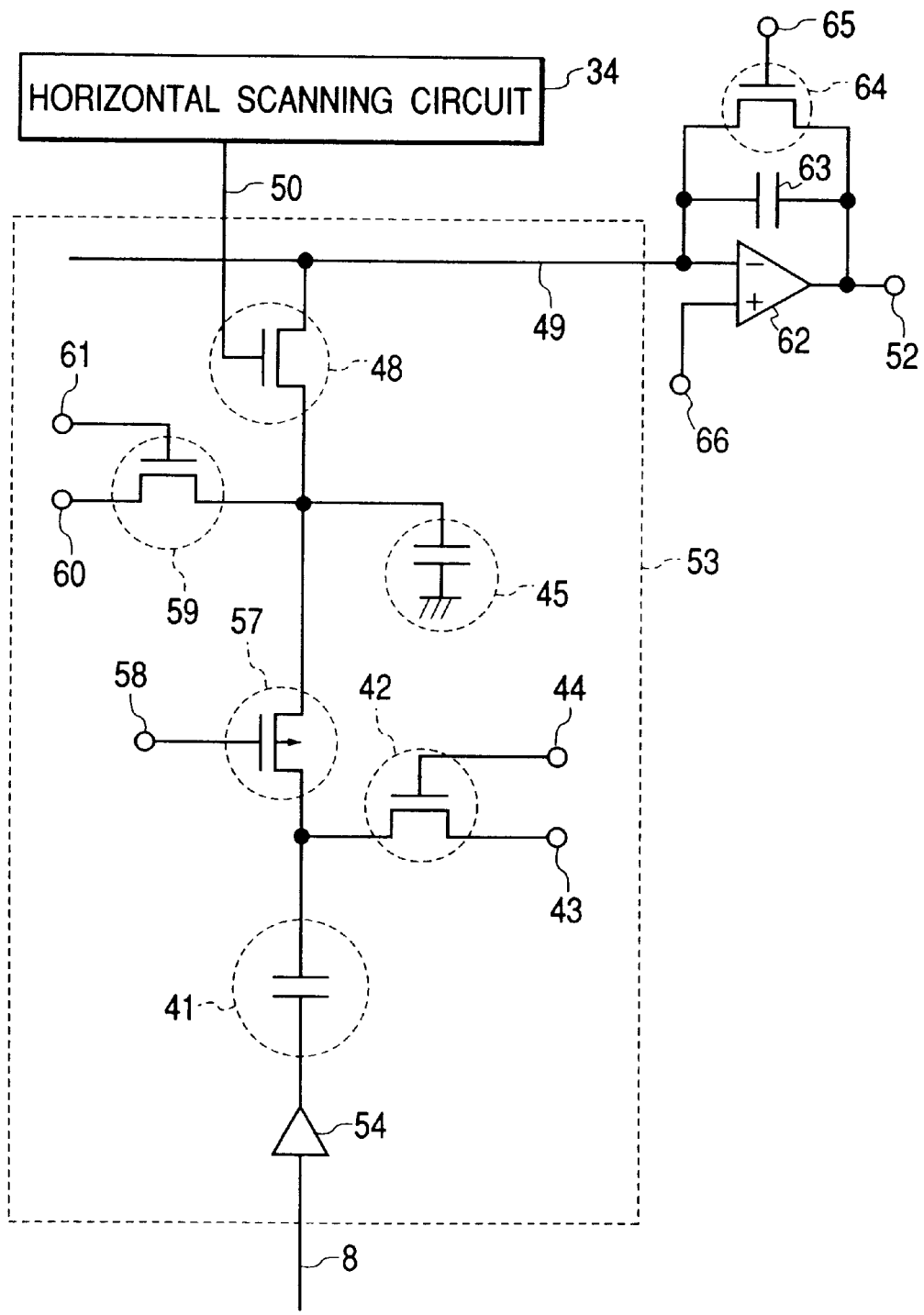
FIG. 8 is a circuit diagram of a third embodiment of the present invention.

FIG. 8 shows a third embodiment of the solid-state image pickup element of the present invention, wherein shown are an operational amplifier 62, a signal charge integrating capacitance 63, an amplifier resetting MOS transistor 64, a gate input terminal 65 of the MOS transistor 64, and a supply terminal 66 of a reference potential entered into a non-inverted (+) input port of the operational amplifier. An electrode of the signal integrating capacitance 63 is connected to an output line 49 and an inverted (−) input terminal of the operational amplifier 62, and the other electrode is connected to the output of the operational amplifier 62.

In FIG. 8, components same as those in FIG. 4 are represented by same numbers and will not be explained further. In the present third embodiment, the operation of the readout circuit 53 is same as that in the first or second embodiment. In FIG. 8, the operational amplifier 62, the signal charge integrating capacitance 63, the amplifier resetting MOS transistor 64, the gate input terminal 65 of the MOS transistor 64 and the reference potential supply terminal 66 constitute a charge integrating amplifier, and the signal charge $C_O \cdot V_S$ accumulated in the capacitance 45 is integrated by the signal charge integrating capacitance 63 of a magnitude $C_S$ so that the terminal 52 provides a signal output voltage $(C_O \cdot V_S)/C_S$ which is independent from $C_T$. Consequently the fixed pattern noise is caused only by the fluctuation in $C_O$, and can be reduced by suppressing the fluctuation in $C_O$.

In the foregoing embodiments, the transfer transistor is composed of a MOS transistor, but it may also be composed of a JFET (junction field effect transistor) or a bipolar transistor as long as a saturation area function is possible.

As explained in the foregoing, the first to third embodiments of the present invention firstly allow to output a high signal voltage and secondly allow to increase the readout speed. In addition it is possible to reduce the fixed pattern noise in the solid state image pickup element.

In the foregoing first to third embodiments, the control of pulse application to the MOS transistor is executed by a timing generation unit 108 (FIG. 9) to be explained later.

In the following there will be explained, with reference to FIG. 9, a fourth embodiment in which the solid-state image pickup element of the first to third embodiments is applied to a signal processing apparatus such as a still camera.

Figure 9:
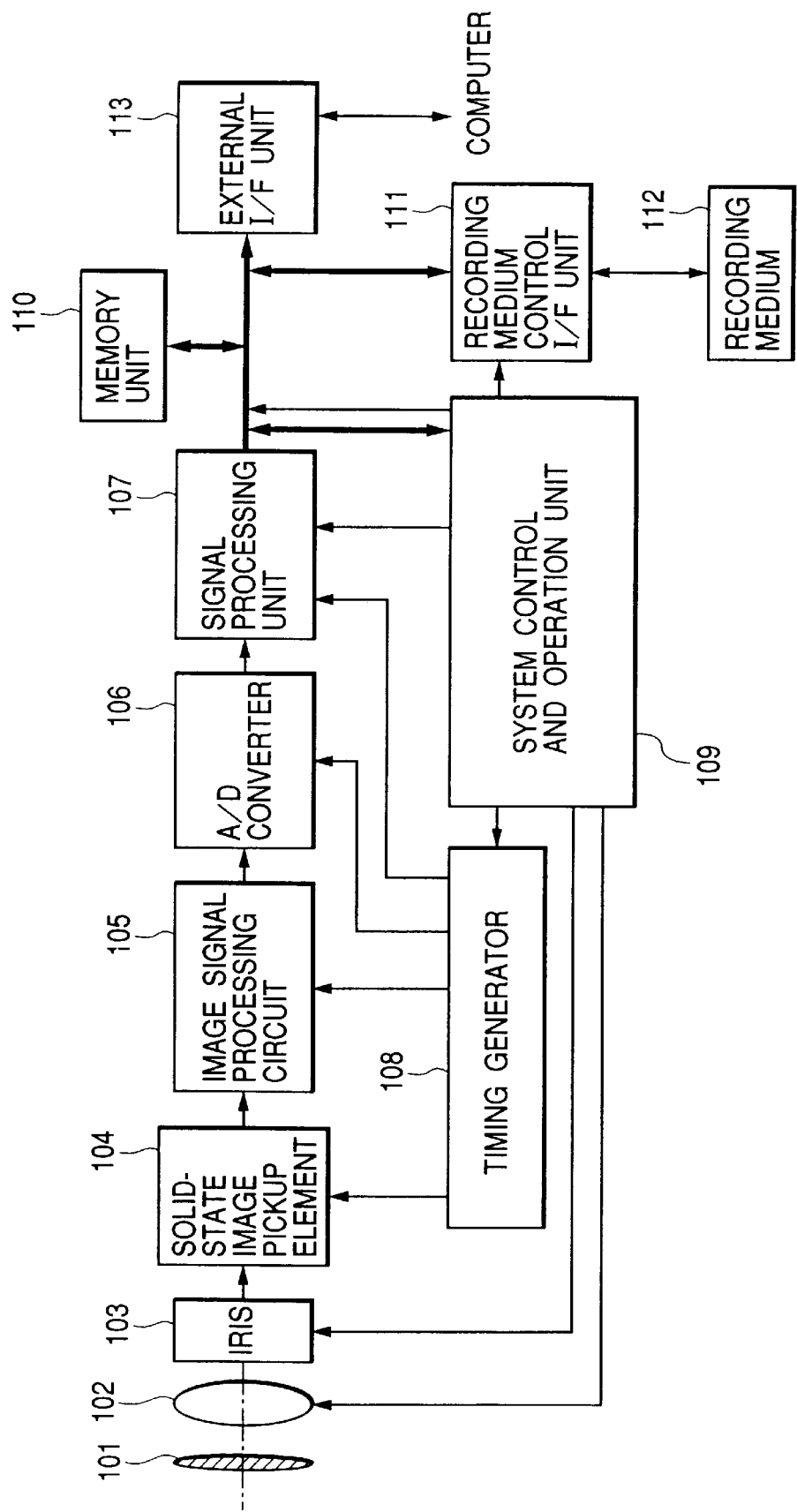
FIG. 9 is a block diagram of an image processing apparatus employing the solid-state image pickup device of the first to third embodiments.

In FIG. 9 there are shown a barrier 101 serving as a lens protector and a main switch, a lens 102 for focusing the optical image of an object on a solid-state image pickup element 104, an iris 103 for varying the amount of light transmitted by the lens 102, a solid-state image pickup element 104 for fetching the object image, focused by the lens 102, as an image signal, an A/D converter 106 for executing analog-digital conversion on the image signal outputted from the solid-state image pickup element 104, a signal processing unit 107 for executing various corrections and data compression on the image data outputted from the A/D converter 106, a timing generating unit 108 for outputting various timing signals to the solid-state image pickup element 104, an image signal processing circuit 105, the A/D converter 106 and the signal processing unit 107, a system control and operation unit 109 for executing various calculations and controlling the entire still video camera, a memory unit 110, an interface unit 111 for executing recording on and readout from a recording medium, a detachable recording medium 112 for executing recording or readout of the image data, such as a semiconductor memory, and an interface unit 113 for communication with an external computer or the like.

In the following there will be explained the operation of the signal processing apparatus of the above-described configuration in the image taking operation.

When the barrier 101 is opened, the main power supply is turned on. Then the power supply for control system is turned on, and the power supply for the image pickup circuits such as the A/D converter 106 etc. is also turned on.

Then, in order to control the exposure amount, the system control and operation unit 109 fully opens the iris 103, and the signal outputted from the solid-state image pickup element 104 is converted by the A/D converter 106 and is input into the signal processing unit 107. Based on such data, the system control and operation unit 109 calculates the exposure.

The luminance is judged from the result of the above-described photometry, and the system control and operation unit 109 controls the iris 103 based on such result.

Then a high frequency component is extracted from the signal outputted from the solid-state image pickup element 104, and the system control and operation unit 109 calculates the distance to the object. Thereafter the lens is driven and there is judged whether the lens is in-focus position, and, if not, the lens is driven again and the distance measurement is repeated.

The main exposure is started after the in-focus state is confirmed.

When the exposure is terminated, the image signal outputted from the solid-state image pickup element 104 is subjected to A/D conversion by the A/D converter 107, then passed by the signal processing unit 107 and is written into the memory unit by the system control and operation unit 109.

The data accumulated in the memory unit 110 is thereafter passed by the recording medium control I/F unit and recorded in the detachable recording medium 112 such as a semiconductor memory, under the control of the system control and operation unit 109.

Otherwise the data may be introduced, through the external I/F unit 113, directly into a computer or the like for image processing.

Many widely different embodiments of the present invention may be constructed without departing from the spirit and scope of the present invention. It should be understood that the present invention is not limited to the specific embodiments described in the specification, except as defined in the appended claims.

What is claimed is:

1. A signal processing apparatus comprising:

clamp capacitance means for receiving, at one electrode thereof, first and second outputted from a signal source;

a signal transfer transistor of which one main electrode is connected to an other electrode of said clamp capacitance means;

signal accumulating capacitance means connected to an other main electrode of said signal transfer transistor;

reset means for fixing the potential of said signal accumulating capacitance means; and control means for fixing the potential of said signal accumulating capacitance means by said reset means while the first signal is outputted from said signal source and maintaining said signal accumulating capacitance means in a floating state while the second signal is outputted from said signal source, and controlling said signal transfer transistor in such a manner that the potential of said one main electrode of said signal transfer transistor is different from that of the other main electrode while the signal charge is transferred through said clamp capacitance means and said signal transfer transistor during the output of said first and second signals, thereby causing the saturation current to transfer said signal charge.

2. A signal processing apparatus according to claim 1, wherein said signal source includes plural photoelectric conversion pixels, and each photoelectric conversion pixel outputs said first and second signals.

3. A signal processing apparatus according to claim 2, wherein the difference of outputs of said first and second signals is transferred through said clamp capacitance means to said signal accumulating capacitance means.

4. A signal processing apparatus according to claim 2, further comprising:

a lens adapted to focus light on said photoelectric conversion pixel;

an analog-digital conversion circuit adapted to convert the signal from said photoelectric conversion pixel into a digital signa; and a signal processing circuit adapted to process the signal from said analog-digital conversion circuit.

5. A signal processing apparatus comprising:

clamp capacitance means for receiving, at one electrode thereof, a signal outputted from a signal source;

a signal transfer transistor of which one main electrode is connected to an other electrode of said clamp capacitance means;

signal accumulating capacitance means connected to an other main electrode of said signal transfer transistor;

reset means for fixing the potential of said signal accumulating capacitance means; and control means for setting the potential of the control electrode of said signal transfer transistor in such a manner that, among the charges on said main electrode of said signal transfer transistor at the side of said clamp capacitance means, varying potential according to the potential change of the output signal from said signal source, a charge of a potential level exceeding the channel potential of said signal transfer transistor is transferred to said signal accumulating capacitance means by a saturation current or a sub-threshold current of said signal transfer transistor.

6. A signal processing apparatus according to claim 5, wherein said signal source includes plural photoelectric conversion pixels.

7. A signal processing apparatus according to claim 6, wherein each photoelectric conversion pixel includes a photoelectric conversion unit and amplifying means for amplifying and outputting a signal from said photoelectric conversion unit, and a signal from said amplifying means is input into an electrode of said clamp capacitance means.

8. A signal processing apparatus according to claim 6, further comprising:

a lens adapted to fucus light on said photoelectric conversion pixel;

an analog-digital conversion circuit adapted to convert the signal from said photoelectric conversion pixels into a digital signal; and a signal processing circuit adapted to process the signal from said analog-digital conversion circuit.

9. A signal processing apparatus according to claim 7, wherein said photoelectric conversion pixel outputs first and second signals, and said control means executes such control as to reset the charge transferred to said signal accumulating capacitance means by said reset means during the output of said first signal and to maintain said signal accumulating capacitance means in a floating state during the output of said second signal, and to accumulating a charge corresponding to the difference of said first and second signals in said signal accumulating capacitance means.

10. A signal processing apparatus according to claim 9, wherein said first signal is a reset level output of said amplifying means, and said second signal is an output of the signal charge accumulated in said photoelectric conversion pixel, superposed on said reset level.

11. A signal processing apparatus according to claim 9, wherein said control means executes such control as to set the potential of the control electrode of said signal transfer transistor at different values respectively at the output of said first signal and at that of said second signal.

12. A signal processing apparatus according to claim 9, further comprising a charge integrating amplifier for reading the signal charge accumulated in said signal accumulating capacitance means.

13. A signal processing apparatus according to claim 10, wherein the output of said photoelectric conversion pixel varies in the positive direction with an increase in the amount of the generated signal charge, and said signal transfer transistor is composed of a P-channel gate-insulated transistor.

14. A signal processing apparatus according to claim 10, wherein the output of said photoelectric conversion pixel varies in the negative direction with an increase in the amount of the generated signal charge, and said signal transfer transistor is composed of an N-channel gate insulated transistor.

* * * * *

UNITED STATES PATENT AND TRADEMARK OFFICE
CERTIFICATE OF CORRECTION

PATENT NO. : 6,791,613 B2
APPLICATION NO. : 09/793572
DATED : September 14, 2004
INVENTOR(S) : Mahito Shinohara et al.

It is certified that error appears in the above-identified patent and that said Letters Patent is hereby corrected as shown below:

ON COVER PAGE AT (57) ABSTRACT

Line 1, "having" should read --having a--;
Line 5, "an other" should read --another--; and
Line 7, "an other" should read --another--.

COLUMN 3

Line 31, "352, the" should read --35-2, the--.

COLUMN 4

Line 4, "off" should read --off;--; and
Line 55, "fluctuation" should read --fluctuations--.

COLUMN 5

Line 36, "same" should read --the same--;
Line 50, "an other" should read --another--; and
Line 52, "an other" should read --another--.

COLUMN 6

Line 8, "an other" should read --another--;
Line 10, "an other" should read --another--; and
Line 61, "same" should read --the same--.

COLUMN 8

Line 59, "same" should read --the same--.

COLUMN 10

Line 29, "an other" should read --another--;
Line 31, "an" should read --an--; and
Line 64, "signa;" should read --signal;--.

UNITED STATES PATENT AND TRADEMARK OFFICE
CERTIFICATE OF CORRECTION

PATENT NO. : 6,791,613 B2
APPLICATION NO. : 09/793572
DATED : September 14, 2004
INVENTOR(S) : Mahito Shinohara et al.

It is certified that error appears in the above-identified patent and that said Letters Patent is hereby corrected as shown below:

<u>COLUMN 11</u>

Line 5, "an other" should read --another--; and
Line 7, "an" should read --an- --.

<u>COLUMN 12</u>

Line 9, "accumulating" should read --accumulate--.

Signed and Sealed this

Twenty-seventh Day of March, 2007

JON W. DUDAS
*Director of the United States Patent and Trademark Office*